United States Patent [19]

Chevreau et al.

[11] Patent Number: 4,571,720
[45] Date of Patent: Feb. 18, 1986

[54] METHOD AND APPARATUS FOR REDUCING THE CONVERGENCE TIME OF AN ECHO CANCELLER

[75] Inventors: Jean-Philippe J. Chevreau, Paris; Loic B. Y. Guidoux, Garancieres, both of France

[73] Assignee: Telecommunications Radioelectriques et Telephoniques T.R.T., Paris, France

[21] Appl. No.: 583,067

[22] Filed: Feb. 23, 1984

[30] Foreign Application Priority Data

Feb. 25, 1983 [FR] France ................................ 83 03113

[51] Int. Cl.$^4$ .............................................. H04B 3/20
[52] U.S. Cl. .................................. 370/32; 179/170.2; 179/170.4
[58] Field of Search ............ 370/32; 179/170.2, 170.4, 179/170.6, 170.8

[56] References Cited

U.S. PATENT DOCUMENTS

| 4,074,086 | 2/1978 | Falconer et al. | 179/170.2 |
| 4,355,214 | 10/1982 | Levy et al. | 179/170.2 |
| 4,377,793 | 3/1983 | Horna | 333/165 |
| 4,449,231 | 5/1984 | Chytil | 179/175 |
| 4,464,545 | 8/1984 | Werner | 179/170.2 |
| 4,481,622 | 11/1984 | Cheng et al. | 370/32 |

Primary Examiner—Joseph A. Orsino, Jr.
Assistant Examiner—Timothy K. Greer
Attorney, Agent, or Firm—Thomas A. Briody; William J. Streeter; Leroy Eason

[57] ABSTRACT

Method and apparatus for reducing the convergence time of an echo canceller including a transversal filter having N adjustable complex coefficients comprises the following steps:

transmitting a complex training signal constituted by data d(n) transmitted at instants nT, where T is the data interval, having a period LT at least equal to NT and having the following two properties:

$$\frac{1}{\sigma^2} \sum_{n=0}^{L-1} d(n) \cdot d^*[(n - i) \text{modulo } L] = -1$$

for every integer i such that $1 \leq i \leq N-1$, and $$\frac{1}{\sigma^2} \sum_{n=0}^{L-1} d^*(n) \cdot d^*[(n - i) \text{modulo } L] = -1$$

for every integer i such that $0 \leq i \leq N-1$;

after the transmission of N data, calculating the coefficients $\vec{C}$ of the transversal filter from the sequence formed by the next L data transmitted, in accordance with the expression:

$$\vec{C} = \vec{C}_o + \frac{2}{(L + 1)\sigma^2} \sum_{n=0}^{L-1} e_R(n) \cdot \vec{D}^*(n)$$

where
$\vec{C}_o$ represents the N initial coefficients,
$e_R(n)$ is the difference signal between the received signal and the real output signal of the transversal filter,
$D^*(n)$ represents the complex conjugate value of the last N data entering the transversal filter, and
$\sigma^2$ is a constant characterizing the power of each of the transmitted data.

6 Claims, 3 Drawing Figures

METHOD AND APPARATUS FOR REDUCING THE CONVERGENCE TIME OF AN ECHO CANCELLER

BACKGROUND OF THE INVENTION

1. Field of the Invention

The invention relates to a method of reducing the convergence time of an echo canceller connected in a transceiver arrangement between one-way transmit and receive paths coupled to a two-way transmission path and used to cancel an echo signal occurring in the receive path in response to a signal supplied to the transmit path, said echo canceller comprising a transversal filter having N adjustable complex coefficients for processing a complex signal derived from the signal supplied to the transmit path and arranged to supply a real signal component, said echo canceller also comprising a difference circuit for producing a difference signal between the signal in the receive path and the output signal of the transversal filter.

2. Description of the Prior Art

Echo cancellers are used, for example, in data transmission modems whose transmit and receive paths, jointly forming a four-wire access, are coupled by a coupling circuit known as a hybrid junction in a manner such that each modem has a two-wire access to the exterior. It is a known fact that when a connection is established between two modems via their two-wire access there may be produced in the receive path of each modem an unwanted signal, called an echo signal, which is a fraction of the signal transmitted by the transmit path of the same modem and which is due to imperfections in the coupling circuit and/or to reflections in the connection. An echo canceller has for its object to cancel this echo signal automatically in order to permit full-duplex transmission between two modems connected by their two-wire access.

In an echo canceller, the coefficients of the transversal filter have to be adjusted so that they are practically equal to samples of the impulse response of the echo path, so that this filter then provides an echo copy signal which practically cancels the echo signal in the output signal from the difference circuit. During the period of transmission of the useful signal the coefficients of the transversal signal are generally adjusted iteratively in accordance with the gradient algorithm so as to minimise the mean square value of the difference signal or error signal appearing at the output of the difference circuit. Unfortunately, this method, applied to the initialization of the coefficients before the transmission of the useful signal results in a very long coefficient-convergence time, amounting to several seconds, which may not be acceptable.

In French Patent Application No. 82 10 310 filed by Applicants on June 14, 1982 and published on Dec. 16, 1983 (French Pat. No. 2528643, granted Nov. 12, 1984), a method for calculating the coefficients is described which permits rapid convergence of the echo canceller before the transmission of the useful signal. Before recalling the essentials of this method, to which the present patent application represents an improvement, it is necessary to point out that the data signal applied to the transmit path is generally transmitted by modulation of an in-phase and a quadrature-phase carrier and, for that purpose, this data signal is first encoded so as to form a complex signal D(n) which may change value at instants nT, where T is the data interval, and which is applied on the one hand to a filter for a complex signal used to produce the modulated carrier signal which is transmitted and on the other hand to the echo canceller. The transversal filter of the echo canceller is then designed to process the complex signal D(n) with the aid of complex coefficients.

A first variant of the method described in the above-mentioned patent application is appropriate to the case when, starting from the signal $\epsilon_R(n)$ received in the receive path, a complex signal $\epsilon(n)$ is formed such that the error signal supplied by the difference circuit of the echo canceller is formed by the difference between the complex signal $\epsilon(n)$ and the complex signal supplied by the transversal signal filter. With this first variant, the N complex coefficients of the echo canceller, represented by the vector matrix row C, can be obtained via the following operations:

transmission in the transmit path of a complex periodic training signal constituted by data d(n) occurring at instants nT, the data being in sequences having a period LT, where L is the number of data in each sequence and LT is at least equal to NT, and having the property:

$$\sum_{n=0}^{L-1} d(n) \cdot d^*[(n-i) \bmod L] = 0 \quad (1)$$

for every integer i such that $1 \leq i \leq N-1$, $d^*(n)$ being the complex conjugate value of data d(n) of the training signal, after the transmission of a sequence of at least N training signal data, calculation of the coefficients C for echo signal cancellation from the sequence of coefficients forms by transmission of the next sequence of L data of the training signal, in accordance with the expression:

$$\vec{C} = \vec{C}_o + \frac{1}{L\sigma^2} \sum_{n=0}^{L-1} \epsilon_R(n) \cdot \vec{D}^*(n) \quad (2)$$

$\vec{C}_o$ being the vector representing the N initial coefficients of the transversal filter, $\vec{D}^*(n)$ being the vector formed by the complex conjugate values of the last N data entering the transversal filter, and $\sigma$ being a term for normalization of the data such that $\sigma^2$ is a constant term representative of the power of each of the transmitted data.

In practice, these initial coefficients are given a value of zero so that during calculation of the coefficients $\vec{C}_o = 0$ and the complex difference signal e(n) is equal to the complex signal $\epsilon(n)$ formed from the received signal $\epsilon_R(n)$. Under these conditions formula (2) may be written:

$$\vec{C} = \frac{1}{L\sigma^2} \sum_{n=0}^{L-1} \epsilon(n) \cdot \vec{D}^*(n) \quad (3)$$

The property of the training signal defined by formula (1) above applies both when the impulse response of the echo path comprises a d.c. component and when that impulse response does not comprise a d.c. component. If consideration is restricted to the case in which the impulse response does not comprise a d.c. component, the property required for the training signal may be, instead of formula (1), the formula (1a), namely:

$$\frac{1}{\sigma^2} \sum_{n=0}^{L-1} d(n) \cdot d^*[(n - i) \text{modulo } L] = -1 \quad (1a)$$

It is then possible to use for calculation of the coefficients formula (2a) or (3a) replacing formulae (2) and (3), namely:

$$\vec{C} = \vec{C}_o + \frac{1}{(L+1)\sigma^2} \sum_{n=0}^{L-1} e(n) \cdot \vec{D}^*(n) \quad (2a)$$

$$\vec{C} = \frac{1}{(L+1)\sigma^2} \sum_{n=0}^{L-1} \epsilon(n) \cdot \vec{D}^*(n) \quad (3a)$$

Starting from the originating moment when generation of the training sequence commences, the N coefficients of the echo canceller may be obtained in a time equal to $NT+LT=(N+L)T$, NT being the maximum duration of the impulse response of the echo path, which determines the number N of coefficients, LT being the period of the training signal. The minimum convergence time is 2NT if L is chosen equal to N.

However, the method according to the above-mentioned patent application, employing this first variant, is somewhat complicated to carry out because it requires a 90° phase-shifter in the received path in order to form the complex signal $\epsilon(n)$ from the received signal $\epsilon_R(n)$. At the same time, calculation of the coefficients necessitates multiplications of complex numbers.

In another variant of the method according to the above-mentioned patent application it is suggested, in order to avoid these complications, that the received signal $\epsilon_R(n)$ which is a real signal, be used to calculate the N complex coefficients. The coefficient-calculation method according to this second variant comprises two steps:

in the first step, the training signal D(n) having either of the aforesaid properties is transmitted and after at least N transmitted data of this signal, coefficients $\vec{C}_1$ are calculated in accordance with formula (3) in which the complex signal $\epsilon(n)$ is replaced by the signal $\epsilon_{R1}(n)$ received in response to the signal transmitted in the course of this first step;

in the second step, the same procedure is adopted, but now with a training signal $D_+(n)$ such that $D_+(n)=j.D(n)$ and coefficients $\vec{C}_2$ are calculated in accordance with formula (3) and replacing $\epsilon(n)$ by the received signal $\epsilon_{R2}(n)$.

The wanted coefficients $\vec{C}$ are obtained after the second step by forming the sum $\vec{C}=\vec{C}_1+\vec{C}_2$. With the method according to the above-mentioned patent application using this second variant, the convergence time of the echo canceller is $2(N+L)T$, with a minimum value of 4NT if L is chosen equal to N.

SUMMARY OF THE INVENTION

It is an object of the present invention to provide a method for initializing the complex coefficients of an echo canceller, also using the received signal directly but permitting calculation of the coefficients in a single step, in a minimum time which may be less than 4NT.

This method involves the transmission of a complex periodic training signal having the property:

$$\frac{1}{\sigma^2} \cdot \sum_{n=0}^{L-1} d(n) \cdot d^*[(n - i) \text{modulo } L] = -1$$

for every integer i such that $1 \leq i \leq N-1$; and, in accordance with the invention, this training signal additionally has the property:

$$\frac{1}{\sigma^2} \cdot \sum_{n=0}^{L-1} d^*(n) \cdot d^*[(n - i) \text{modulo } L] = -1$$

for every integer i such that $0 \leq i \leq N-1$, and, after the transmission of at least N data of the training signal, the coefficients of the transversal signal are calculated from the sequence formed by the next L data transmitted, in accordance with the expression:

$$\vec{C} = \vec{C}_o + \frac{2}{(L+1)\sigma^2} \sum_{n=0}^{L-1} e_R(n) \vec{D}^*(n)$$

$\vec{C}$ being the vector of the N coefficients obtained at the end of the calculation, $\vec{C}_o$ being the vector of the N initial coefficients, $e_R(n)$ being the difference signal, $\vec{D}^*(n)$ being the vector of the complex conjugate values of the last N data entering the transversal filter, and $\sigma^2$ being a constant term representing the power of each of the transmitted data.

In practice, the initial coefficients $C_o$ of the transversal filter are set to zero, which additionally makes it possible to substitute the received signal $\epsilon_R(n)$ for the difference signal $e_R(n)$ in the formula for calculating the coefficients.

In the case, often encountered in practice, where the impulse response of the echo path includes a d.c. component, the coefficients calculated as described above will be faulty. A variant of the present invention provides a very simple method for correcting these calculated coefficients.

According to this variant, the training signal data are transmitted towards the transmission path with a delay at least equal to one data interval T with respect to the data applied to the transversal filter, the number N of the coefficients of the transversal filter is chosen at least one unit greater than the number thereof corresponding to the maximum duration of the impulse response of the echo path and finally, when calculation of the coefficients is terminated, the first calculated coefficient or one of the subsequent coefficients calculated is deducted from the other calculated coefficients so as to form the desired coefficients of the transversal filter.

The present invention, finally, provides a simple method enabling a training sequence having the two properties described above to be generated.

According to this method, the data d(n) of the training signal are formed from two identical pseudo-random sequences of maximum length L, each comprising +1 and −1 elements generated in synchronism with the frequency 1/T, these two sequences being shifted with respect to one another by a number k of data intervals T, the real and imaginary components of each of the data d(n) at an instant nT being obtained respectively by additive and subtractive combination (or vice versa) of the values of the elements of the two sequences at the same instant nT.

The length L of the two pseudo-random sequences is chosen such that $L \geq 2N+1$ and the shift between these two sequences is preferably chosen such that $k=(L-1)/2$. In this case the convergence time of the echo canceller can be reduced to a value of, to all intents and purposes, 3NT.

Features of the invention will be more fully appreciated from the following description of an exemplary embodiment when considered in conjunction with the accompanying drawing.

DESCRIPTION OF THE PREFERRED EMBODIMENTS

Figure 1:
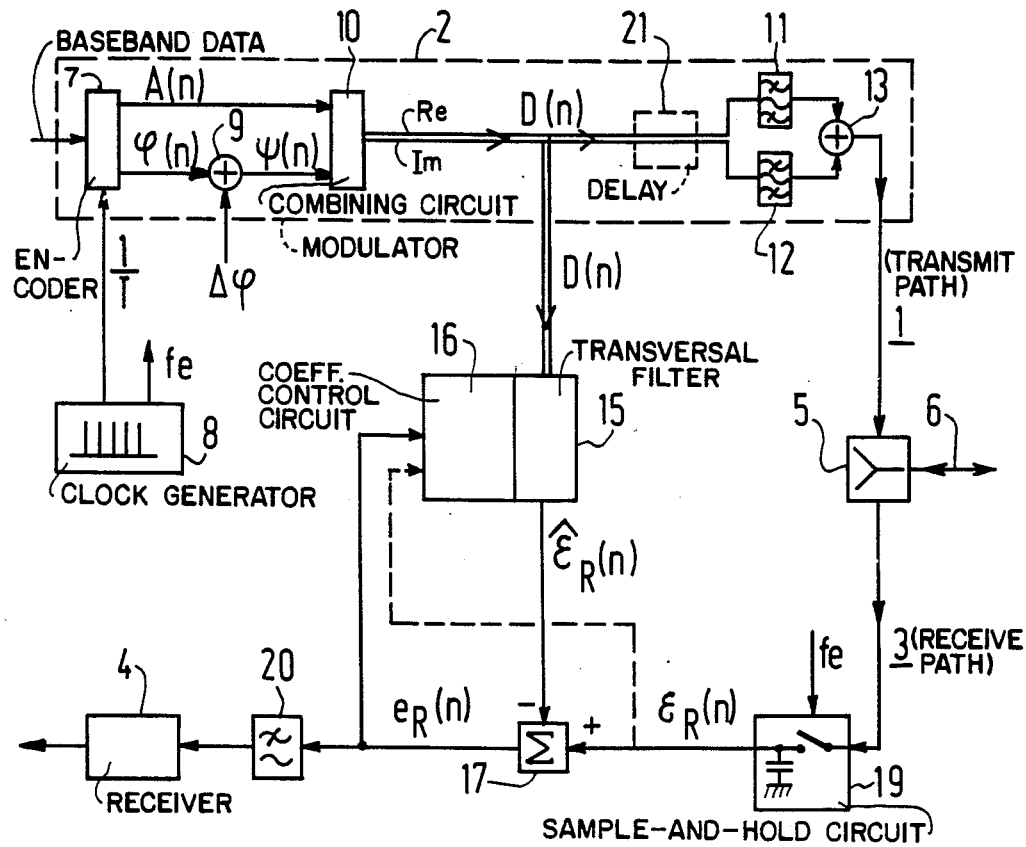
FIG. 1 shows the block diagram of a modem provided with an echo canceller to which the method according to the invention can be applied.

The modem incorporating an echo canceller whose block diagram is shown in FIG. 1 comprises a transmit path 1 provided with a modulator 2 receiving baseband data to be transmitted and a receive path 3 provided with a receiver 4, whose task is to restore transmitted data originating from a remote modem. The output of modulator 2 is connected to the transmit access of a (hybrid) coupling circuit 5 and the receive access of this coupling circuit is connected, by way of a given number of elements to be described hereinafter, to the input of receiver 4. This coupling circuit 5 enables the one-way transmit and receive paths of the modem to be connected to a two-way transmission path 6 for full-duplex connections with a remote modem, not shown, coupled in the same manner to the transmission path 6.

When modulator 2 transmits in the transmit path 1 a signal modulated by the data to be transmitted towards the remote modem, there may be produced in the receive path 3 an unwanted echo signal resulting from imperfections in coupling circuit 5 or from reflections in transmission path 6 and which may interfere in receiver 4 with the demodulation of the received signal originating from the remote modem. The echo canceller incorporated in the modem in FIG. 1 has the task of eliminating the echo signal in the receive path 3.

This echo canceller uses a complex data signal which is formed in modulator 2 from the baseband data to be transmitted and which permits transmission by modulation of an in-phase and a quadrature-phase carrier. In the example of embodiment as shown, modulator 2 comprises an encoding circuit 7 receiving the data to be transmitted and supplying a pair of signals representative of the amplitudes $A(n)$ and of the phase changes $\phi(n)$ to be assigned to the carrier as a function of the data at instants $nT$ determined by a generator 8 of a clock signal at the frequency $1/T$, $1/T$ being the modulation rate and $n$ an integer varying from $-\infty$ to $+\infty$. To take account of the phase variation $\Delta\phi$ of the (unmodulated) carrier during each modulation interval $T$, an adder 9 is used to supply at each instant $nT$ the sum $\phi(n)+\Delta\phi$, which is representative of the absolute phase $\psi(n)$ of the modulated carrier to be transmitted. The amplitude signal $A(n)$ and the phase signal $\psi(n)$ are applied to a combining circuit 10 which forms the real component $A(n)\cdot\cos\psi(n)$ and the imaginary component $A(n)\cdot\sin\psi(n)$ of a complex signal $D(n)$. In modulator 2 the complex signal $D(n)$ is applied to a bandpass filter for a complex signal formed by two bandpass filters 11 and 12 which respectively receive the real component and the imaginary component of signal $D(n)$ and whose passband is centred on the frequency of the carrier used for transmission. The output signals of the two filters 11 and 12 are added in an adder 13 to form the analog modulated carrier signal which is applied to the transmit access of coupling circuit 5.

The complex signal $D(n)$ thus formed in modulator 2 is also used in the echo canceller. It should be noted here that for greater clarity the leads conveying complex signals are shown in the block diagram in FIG. 1 by double lines and the leads conveying real signals by single lines. The echo canceller comprises a transversal filter 15 receiving the complex signal $D(n)$ sampled at instants $nT$ and assumed, in order to simplify the diagram, to be of an analog type. Transversal filter 15 is provided with a control circuit 16 for its complex coefficients. When the method according to the present invention is used, transversal filter 15 is designed, as it has been shown in FIG. 1, to supply a real output signal $\hat{\epsilon}_R(n)$, which is the real component of a complex signal resulting from the complex input signal $D(n)$ and the complex coefficients. The output signal $\hat{\epsilon}_R(n)$ of transversal filter 15 is applied to the (−) input of a difference circuit 17. To the (+) input of this difference circuit 17 are applied the samples of the signal appearing at the receive access of coupling circuit 5. These samples are formed with the aid of a sample-and-hold circuit 19 in which sampling is effected at a frequency $f_e$ provided by generator 8. This frequency $f_e$ is a multiple of the modulation frequency $1/T$, thus $F_e=q/T$ with $q$ an integer, and is such that the Shannon theorem is respected with regard to the echo signal. However, in order to simplify explanation, of the samples provided by circuit 19, only those marked $\epsilon_R(n)$ which are produced at the frequency $1/T$ at the same instants $nT$ as the samples of the data signal $D(n)$ will be considered henceforth. In fact, the received signal sampled at the frequency $f_e=q/T$ may be considered as being formed of $q$ interleaved sequences of samples at the frequency $1/T$ and it is a well-known fact that in echo-canceller technology these $q$ sequences of samples can be processed in the same manner, in $q$ echo sub-cancellers each working independently at the frequency $1/T$.

The real signal $\epsilon_R(n)$ supplied by difference circuit 17 is applied to control circuit 16 in which it is used to adjust the coefficients of transversal circuit 15. When these coefficients are suitably adjusted, the echo copy signal $\hat{\epsilon}_R(n)$ supplied by transversal filter 15 is substantially equal to the echo signal appearing at the receive access of coupling circuit 5 so that in the signal $\epsilon_R(n)$ supplied by difference circuit 17 the echo signal is practically cancelled. This difference signal thus freed from the echo signal is applied to receiver 4 via a lowpass filter 20.

During the period of transmission of the useful data the coefficients of the echo canceller are generally controlled iteratively in circuit 16, using the gradient algorithm so as to minimize the mean-square value of the error signal supplied by difference circuit 17. To obtain the optimum value of these coefficients quickly before this transmission phase, there has been provided in the aforesaid French Patent Application No. 82 10 310 a method based on the transmission of a training signal $D(n)$ having the property defined by formula (1) or by formula (1a) when the echo signal has no d.c. component. As has been explained, if a complex signal $\epsilon(n)$ is formed from the real signal received, the complex signals of the echo canceller can, to all intents and purposes, be calculated from the formula (3). To avoid the formation of a complex signal and calculate the complex coefficients of the echo canceller directly from the real received signal $\epsilon_R(n)$, a two-step method has also been described which, as has been explained, has the disadvantage of doubling the time required for calculation of the coefficients. The present invention provides a method for calculating the coefficients also using the real received signal directly but with a shorter time for calculating the coefficients.

According to the method of the invention, the complex signal $D(n)$ applied simultaneously to filters 11 and 12 for producing the transmitted modulated carrier, and to transversal filter 15 of the echo canceller, is a periodic training signal of data sequences having a period LT at least equal to NT, such training signal having the following two properties:

$$\frac{1}{\sigma^2} \cdot \sum_{n=0}^{L-1} d(n) \cdot d^*[(n - i) \bmod L] = -1 \quad (4)$$

for every integer i such that $1 \leq i \leq N-1$, and $$\frac{1}{\sigma^2} \cdot \sum_{n=0}^{L-1} d^*(n) \cdot d^*[(n - i) \bmod L] = -1 \quad (5)$$

for every integer i such that $0 \leq i \leq N-1$.

Means will be described hereinafter for obtaining very simply a training signal having these properties. It may be noted on this subject that, in the above-mentioned French Patent Application No. 83 10 310, a signal having similar properties but with a second member equal to zero had been recommended. It may be said in a general manner that signals having properties (4) and (5) (with $-1$ in the second member) are simpler to generate. They can be obtained from generators of pseudo-random sequences of maximum length L which can be chosen as large as is wished ($L = 2^p - 1$ with p an integer). On the other hand, signals having the properties (4) and (5), but with zero in the second member, have a period of limited length L if it is decided not to use values for symbols other than those normally transmitted by the modulator.

After the transmission of at least N data of the training signal $D(n)$, an echo signal appears at the receiving access of coupling circuit 5 and, with the aid of this echo signal $\epsilon_R(n)$ and the following L data of the training signal $D(n)$, the N coefficients of transversal filter 15 are calculated in circuit 16 in accordance with the expression:

$$\vec{C} = \vec{C}_o + \frac{2}{(L+1)\sigma^2} \sum_{n=0}^{L-1} e_R(n) \cdot \vec{D}^*(n) \quad (6)$$

The terms used in this expression (6) have already been defined. The initial N coefficients represented by the vector $\vec{C}_o$ are maintained throughout the duration of the calculation at the end of which the coefficients $\vec{C}$ are obtained.

In practice the initial coefficients $\vec{C}_o$ are set to zero, so that throughout the duration of the calculation the signal $\hat{\epsilon}_R(n)$ supplied by the transversal filter is zero and thus the difference signal $e_R(n)$ is equal to the received signal $\epsilon_R(n)$. Operating in this manner, the coefficients can be calculated in accordance with the expression:

$$\vec{C} = \frac{2}{(L+1)\sigma^2} \sum_{n=0}^{L-1} e_R(n) \cdot \vec{D}^*(n) \quad (7)$$

or the expression:

$$\vec{C} = \frac{2}{(L+1)\sigma^2} \sum_{n=0}^{L-1} \epsilon_R(n) \cdot \vec{D}^*(n) \quad (7a)$$

The line of dashes in FIG. 1 indicates the use of the signal $\epsilon_R(n)$ in circuit 16 in the case when the coefficients are calculated in accordance with formula (7a). This latter formula is the one that will be used henceforth to simplify writing, it being understood that the same conclusions apply when formulae (6) or (7) is used.

It will now be shown under what conditions it is possible to obtain, at the end of the calculation of the coefficients in accordance with formula (7a), the coefficients of the transversal filter permitting cancellation of the echo signal. The vectorial notation will be used for this demonstration.

The vector $\vec{D}(n)$ with N components representing the N samples of the complex signal $D(n)$ present in the transversal filter at an instant nT has already been defined. The transpose of vector $\vec{D}(n)$ will be denoted henceforth by $\overleftarrow{D}(n)$. The vector $\vec{C}$ with N components representing the N calculated coefficients of the transversal filter has also been defined. The vector $\vec{k}$ with N complex components representing samples of the impulse response of the echo path to which the signal $D(n)$ is applied can now be defined. The coefficients of the transversal filter are optimal and permit cancellation of the echo if $\vec{C} = \vec{k}$.

With these notations the complex version $\epsilon(n)$ of the received echo signal $\epsilon_R(n)$ in the receive path may be written:

$$\epsilon(n) = \overleftarrow{D}(n) \cdot \vec{k}$$

The received echo signal $\epsilon_R(n)$ is the real part of the complex signal $\epsilon(n)$ and may be written:

$$\epsilon_R(n) = \mathbb{R}_e[\epsilon(n)]$$

Taking the preceding formula into account, the following will be readily obtained:

$$\epsilon_R(n) = \tfrac{1}{2}[\overleftarrow{D}(n) \cdot \vec{k} + \overleftarrow{D}^*(n) \cdot \vec{k}^*] \quad (8)$$

where $\overleftarrow{D}^*(n)$ and $\vec{k}^*$ are conjugate values of $\overleftarrow{D}(n)$ and $\vec{k}$.

If (8) is taken into account formula (7a) may be written:

$$\vec{C} = \frac{1}{(L+1)\sigma^2} \sum_{n=0}^{L-1} [\overline{\overline{E}}(n) \cdot \vec{k} + \overline{\overline{F}}(n) \cdot \vec{k}^*]$$

where $\overline{\overline{E}}(n)$ and $\overline{\overline{F}}(n)$ are N-order matrixes such that:

$$\overline{\overline{E}}(n) = \sum_{n=0}^{L-1} \vec{D}^*(n) \cdot \overleftarrow{D}(n)$$

$$\overline{\overline{F}}(n) = \sum_{n=0}^{L-1} \vec{D}^*(n) \cdot \overleftarrow{D}^*(n)$$

The matrix $\overline{\overline{E}}(n)$ has as its generic term:

$$e_{ij}(n) = \sum_{n=0}^{L-1} d^*[(n - i)\text{modulo } L] \cdot d[(n - j)\text{modulo } L]$$

If property (4) of the training signal is taken into account, this yields:

$$e_{ij}(n) = -\sigma^2$$

for all values of i, j such that $i \neq j$.

On the other hand there also results:

$$e_{ii}(n) = \sum_{n=0}^{L-1} |d(n)|^2 = L\sigma^2,$$

where $\sigma^2$ is the power of each of the data in the training signal.

The term $\overline{\overline{E}}(n) \cdot \vec{k}$ appearing in formula (9) can then be written:

$$\overline{\overline{E}}(n) \cdot \vec{k} = (L + 1)\sigma^2 \vec{k} - \left[ \sum_{i=0}^{N-1} k_i \right] \vec{I} \quad (10)$$

$k_i$, for $i = 0, 1 \ldots N-1$, being the N components of the vector $\vec{k}$, $I$ being the vector with N components of unit value.

The matrix $\overline{\overline{F}}(n)$ has as its generic term:

$$f_{ij}(n) = \sum_{n=0}^{L-1} d^*[(n - i)\text{modulo } L] \cdot d^*[(n - j)\text{modulo } L]$$

If property (5) of the training signal is taken into account, this yields:

$$f_{ij}(n) = -\sigma^2$$

whatever i and j are.

The term $\overline{\overline{F}}(n) \cdot \vec{k}^*$ appearing in formula (9) can then be written:

$$\overline{\overline{F}}(n) \cdot \vec{k}^* = -\left[ \sum_{i=0}^{N-1} k^*_i \right] \vec{I} \quad (11)$$

Taking formulae (10) and (11) into account, formula (9) is finally written:

$$\vec{C} = \vec{k} - \frac{1}{(L + 1)\sigma^2} \left[ \sum_{i=0}^{L-1} (k_i + k^*_i) \right] \vec{I}$$

If $k_{iR}$, the real part of the complex samples $k_i$ of the impulse response of the echo path, is called in, it is also possible to write:

$$\vec{C} = \vec{k} - \frac{2}{(L + 1)\sigma^2} \left[ \sum_{i=0}^{N-1} k_{iR} \right] \vec{I} \quad (12)$$

In this expression (12), the term $$\sum_{i=0}^{N-1} k_{iR}$$

represents the d.c. component of the real part of the impulse response of the echo path. If this d.c. component is zero, the expression (12) reduces to $\vec{C} = \vec{k}$, which demonstrates that the coefficients $\vec{C}$ calculated in accordance with formula (7a) with a training signal having the properties (4) and (5) enable the echo signal to be cancelled.

Generally, however, the said d.c. component is not zero. For example, in the band-pass type of echo canceller considered in FIG. 1, if the sampling frequency of the received signal is equal to 1/T, i.e. lower than the Shannon frequency, the d.c. component of the impulse response of the echo path is obviously not zero. But even if the received signal is sampled at a sampling frequency $f_e = q/T$ satisfying Shannon's theorem, the same conclusion is arrived at. In fact, as has been explained above, the echo canceller may be designed as q echo sub-cancellers operating on a time-division basis, each echo sub-canceller operating independently on the received signal sampled at the modulation frequency 1/T. The result is that for each echo sub-canceller the d.c. component of the impulse response of the echo path is not zero.

In the case where the d.c. component of the impulse response of the echo path is not zero, the coefficients $\vec{C}$ obtained all differ, according to formula (12), from the ideal value $\vec{k}$ by the same value $x_o$ such that:

$$x_o = -\frac{2}{(L + 1)\sigma^2} \left[ \sum_{i=0}^{N-1} k_{iR} \right] \quad (13)$$

The invention provides a very simple means for correcting coefficients calculated on the basis of formula (7a) and obtaining the correct coefficients. It is sufficient to subtract the value $x_o$ from each coefficient calculated. In other words, if the coefficients calculated in accordance with formula (7a) are called $\vec{C}'$, the correct coefficients $\vec{C} = \vec{k}$ are obtained by performing the operation:

$$\vec{C} = \vec{C}' - x_o \vec{I} \quad (14)$$

To calculate the correction term $x_o$, the transmitted data of the training signal D(n) are delayed, with the aid of a delay circuit 21 indicated by lines of dashes in FIG. 1, by a modulation period T with respect to the data of the signal D(n) applied to the transversal filter of the echo canceller. Under these conditions, from the point of view of the echo canceller, the first coefficient $k_o$ of the impulse response of the echo path is necessarily zero. If, on the other hand, the number N of coefficients of the transversal filter has been chosen one unit greater than the strictly necessary number, corresponding to the maximum duration of the impulse response of the echo path, calculation of the coefficients of the transversal filter with the aid of formula (7a) yields the value $C'_o = x_o$ for the first coefficient. The correction value $x_o$ thus formed is subtracted from the other coefficients calculated, which, in accordance with formula (14), makes it possible to obtain the correct coefficients. Of course, if the transmitted data are delayed by several periods T, it is possible to obtain, with an adapted number of coefficients N, several correction values $x_o$, which are in principle identical.

A simple method for obtaining a complex training signal whose data d(n) have the properties (3) and (4) will now be described.

Figure 2:
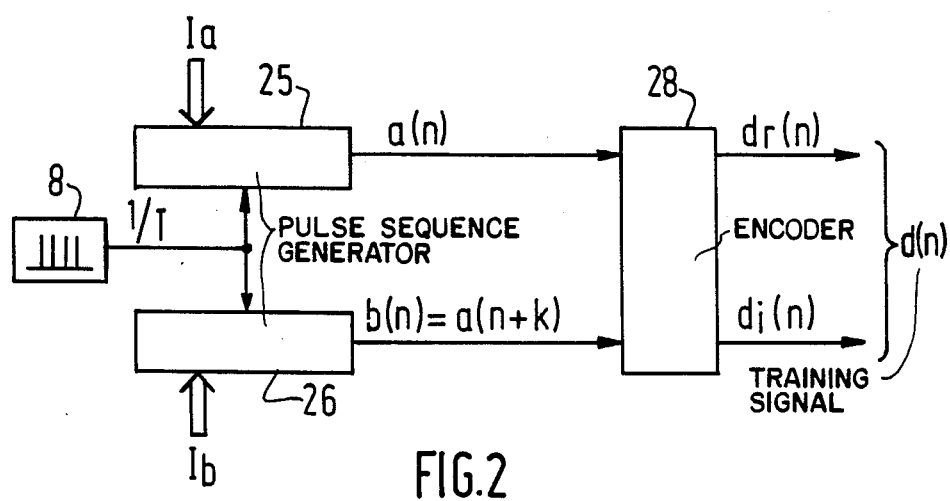
FIG. 2 shows a block diagram of a possible apparatus for generating the training signal used in the method according to the invention.

This method can be carried out as FIG. 2 shows by way of example. The apparatus in FIG. 2 comprises two pulse generators 25 and 26 of pseudo-random sequences of maximum length. These two generators are identical and consist, in a very well known manner, of a shift register with p elements, the outputs from two elements being applied to an Exclusive-OR circuit whose output is connected to the input of the register. The pulses with frequency 1/T supplied by generator 8 are used to shift the registers of the two generators. The two generators supply identical sequences with a length $L=2^p-1$, but shifted with respect to one another by k elements by means of suitable initialization signals $I_a$ and $I_b$. Thus, if the binary signals produced respectively by generators 25 and 26 are called a(n) and b(n), it is possible to write:

$$b(n) = a(n+k).$$

The two binary signals a(n) and b(n) are applied to an encoder 28 which supplies the desired complex training signal, consisting of complex data d(n), having a real component $d_r(n)$ and an imaginary component $d_i(n)$. Table I below shows the operations performed in encoder 28. To simplify the description it is assumed that the data supplied by circuit 28 are normalised, i.e. the normalization coefficient $\sigma$ for these data is equal to one.

TABLE I

| a(n) | b(n) | $d_r(n)$ | $d_i(n)$ | d(n) |
|------|------|----------|----------|------|
| 1    | 1    | 1        | 0        | 1    |
| 1    | -1   | 0        | 1        | j    |
| -1   | 1    | 0        | -1       | -j   |
| -1   | -1   | -1       | 0        | -1   |

The two generators 25 and 26 being assumed to supply binary signals a(n) and b(n) with a value −1 or 1, the first two columns show the four possible configurations for pairs of signals a(n) and b(n).

The next two columns show the values of the signals $d_r(n)$ and $d_i(n)$ which are respectively the real component and the imaginary component of the desired complex signal d(n) whose values are indicated in the last column. $d_r(n)$ and $d_i(n)$ are derived from a(n) and b(n) via combination equations:

$$\begin{cases} d_r(n) = \frac{1}{2}[a(n) + b(n)] \\ d_i(n) = \frac{1}{2}[a(n) - b(n)] \end{cases} \quad (15)$$

It can be seen that signals a(n) and b(n) with two levels +1 and −1 have been combined to form signals $d_r(n)$ and $d_i(n)$ with three levels +1, −1 and 0 so that the complex signal d(n) assumed the real values +1 or −1 or the imaginary values +j and −j.

It may be observed that the complex signal d(n) could also be formed from the combination equations:

$$\begin{cases} d_r(n) = \frac{1}{2}[a(n) - b(n)] \\ d_i(n) = \frac{1}{2}[a(n) + b(n)] \end{cases} \quad (16)$$

The signs of the second members in the formulae (15) and (16) above could also be changed.

It will be clear that, instead of forming the complex data d(n) of the training signal, as has just been explained, with the aid of two pseudo-random sequence generators and an encoding circuit, it would also be possible to store in a memory the aforesaid components $d_r(n)$ and $d_i(n)$ of the data d(n) of a period LT of the training sequence and to read out these components at the rate 1/T.

It will now be described how the training signal formed in one way or another, as has just been explained, can be used optimally.

To simplify the description, the first member of formula (4) which defines one of the properties demanded for the training signal, where $\sigma = 1$ since it has been assumed that the data supplied by circuit 28 were normalized, will be called AC(i). This then yields:

$$AC(i) = \sum_{n=0}^{L-1} d(n) \cdot d^*[(n-i) \text{modulo } L] \quad (17)$$

where AC(i) is the autocorrelation function of the complex signal d(n) for a shift i.

The first memner of formula (5) which defines the other property demanded for the training signal, where $\sigma = 1$ too, will be called B(i), so that:

$$B(i) = \sum_{n=0}^{L-1} d^*(n) \cdot d^*[(n-i) \text{modulo } L] \quad (18)$$

The two functions AC(i) and B(i) are periodic with a period L.

With the training signal consisting of complex data d(n) formed, as has been explained above, from two pseudo-random sequences of identical maximum length but shifted by k with respect to one another, then encoded an indicated in Table I, it then can be shown that, in a period L such as that defined for i varying from 0 to L−1, the autocorrelation function AC(i) assumes the following values:

$$AC(0) = L \quad (19)$$

$$AC(k) = -1 + j\frac{L+1}{2}$$

$$AC(L-k) = -1 - j\frac{L+1}{2}$$

Figure 3:
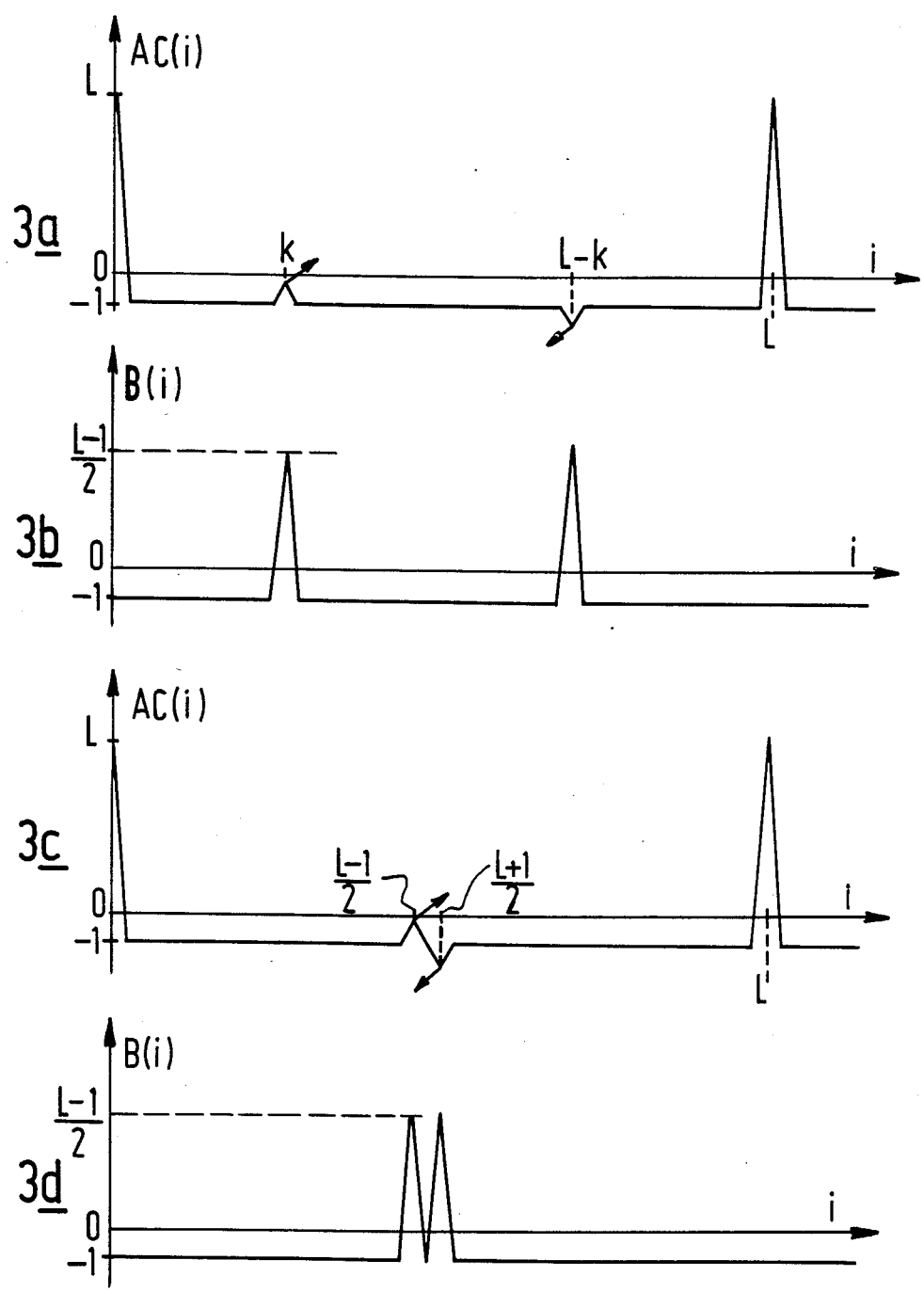
FIG. 3 shows diagrams representing the functions AC(i) and B(i) characterizing the training signal provided by the apparatus in FIG. 2.

AC(i) = −1 for all other values of i, i.e.
$1 \leq i \leq L - 1, i \neq k, i \neq L - k.$ These values AC(i) are entered in diagram 3a of FIG. 3 as functions of i. It will be noted in particular that for i=k and i=L−k (k<L−k has been chosen in the figure), the function AC(i) assumes two complex conjugate values indicated by sloping arrows. Starting from i=L, the function AC(i) is reproduced with the period L.

It can also be shown that the function B(i) assumes the following values in a period for i ranging from 0 to L−1:

$$B(k) = B(L-k) = \frac{L-1}{2} \quad (20)$$

B(i) = −1 for all other values of i, i.e.
$0 \leq i \leq L - 1, i \neq k \text{ and } i \neq L - k.$ These values of B(i) are entered in diagram 3b of FIG. 3 as a function of i.

Using the notations for formulae (17) and (18), formulae (4) and (5) defining the properties required for the training signal are written:

$$AC(i) = -1 \text{ for every } i \text{ such that } 1 \leq i \leq N - 1 \quad (21)$$

-continued $$B(i) = -1 \text{ for every } i \text{ such that } 0 \leq i \leq N-1 \quad (22)$$

It will be noted that the training signal d(n) formed as has been explained has these properties provided that N is chosen so that:

$$N \leq k_{inf}$$

where $k_{inf}$ stands for the smaller of the two values k and L−k.

For a data signal d(n) with a given period L, it is always an advantage to remove as far as possible from the origin i=0 the unwanted terms AC(k) and AC(L−k) of the autocorrelation function.

This is obtained for $$k = (L-1)/2 \quad (23)$$

since $L = 2^p - 1$ is odd, k is certainly an integer. This means that:

$$L - k = (L+1)/2 \quad (24)$$

For these particular values (23) and (24) of k and L−k, the two unwanted terms AC(k) and AC(L−k) are as near one another as possible, as diagram 3c shows. The result than, under these conditions, is $$AC(i) = -1 \text{ for every } i \text{ such that } 1 \leq i \leq \frac{L-1}{2} - 1. \quad (25)$$

For the particular values (23) and (24) of k and L−k the two unwanted terms of B(i), namely B(k) and B(L−k), are also as near one another as possible, as diagrams 3d shows. The result, in these conditions, is then:

$$B(i) = -1 \text{ for every } i \text{ such that } \quad (26)$$

$$0 \leq i \leq \frac{L-1}{2} - 1.$$

It follows from the properties (21) and (22), which are strictly required for the training signal, that a training signal of period L, formed as has been explained with $k = (L-1)/2$, is suitable for any echo canceller incorporating a transversal filter with a length N such that:

$$N \leq (L-1)/2.$$

Conversely, for a transversal filter with a given length N, it is necessary to choose a training signal formed as has been explained and having a period L such that:

$$L \geq 2N + 1.$$

With this training signal, the convergence time (L+NT) can be reduced, when $N = (L-1)/2$, to $(3N+1)T \approx 3NT$.

What is claimed is:

1. A method for reducing the convergence time of an echo canceller connected in a transceiver arrangement between one-way transmit and receive paths coupled to a two-way transmission path and used to cancel an echo signal occurring in the receive path in response to a signal supplied to the transmit path, said echo canceller comprising a transversal filter having N adjustable complex coefficients for processing a complex signal derived from the signal supplied to the transmit path and arranged to supply a real signal component, said echo canceller also comprising a difference circuit for producing a difference signal between the signal in the receive path and the output signal of the transversal filter, this method comprising the steps of:

transmitting in the transmit path a complex periodic training signal constituted by data d(n) occuring at instants nT, where T is the data interval and n is an integer, the data being in sequences having a period LT, where L is the number of data in each sequence and LT is at least equal to NT, and having the property:

$$\frac{1}{\sigma^2} \sum_{n=0}^{L-1} d(n) \cdot d^*[(n-i) \text{modulo } L] = -1$$

for every integer i such that $1 \leq i \leq N-1$, d*(n) being the complex conjugate value of d(n) and $\sigma^2$ being a constant term representative of the power of each of the transmitted data;

said transmitted training signal further having the property:

$$\frac{1}{\sigma^2} \sum_{n=0}^{L-1} d^*(n) \cdot d^*[(n-i) \text{modulo } L] = -1$$

for every integer i such that $0 \leq i \leq N-1$;

and after the transmission of a sequence of at least N data of the training signal, calculating the coefficients of the transversal filter for echo signal cancellation from the sequence of coefficients formed by transmission of the next sequence of L data, in accordance with the expression:

$$C = C_o + \frac{2}{(L+1)^2} \sum_{n=0}^{L-1} e_R(n) \cdot D^*(n)$$

where C is the vector of the N coefficients obtained at the end of the calculation, $C_o$ is the vector of the N initial coefficients, $e_R(n)$ is said difference signal, $D^x(n)$ is the vector of the complex conjugate of values of the last N data entering the transversal filter, and $\sigma^2$ is a constant term representative of the power of each of the transmitted data.

2. A method as claimed in claim 1 wherein the initial coefficients of the transversal filter are set to zero and the coefficients $\vec{C}$ are calculated in accordance with the expression:

$$\vec{C} = \frac{2}{(L+1)\sigma^2} \sum_{n=0}^{L-1} \epsilon_R(n) \cdot \vec{D}^*(n)$$

where $\epsilon_R(n)$ is the signal received in the receive path.

3. A method as claimed in claim 1 wherein the data of the training signal are transmitted towards the transmission path with a delay at least equal to one data interval T with respect to the data applied to the transversal filter, the number N of the coefficients of the transversal filter is chosen at least one unit greater than the number of such coefficients corresponding to the maximum duration of the impulse response of the echo path and, after calculation of the coefficients, the first coefficient calculated or one of the subsequent coefficients calculated is deducted from the other calculated coefficients so as to form the coefficients of the transversal filter.

4. A method as claimed in claim 1 wherein the data d(n) of the training signal are formed from two identical pseudo-random sequences of maximum length L, each comprising +1 and −1 elements generated in synchronism at the frequency 1/T, these two sequences being shifted a number k of data intervals T with respect to one another, the real and imaginary components of each of the data d(n) at an instant nT being obtained respectively by additive and subtractive combination of the values of the elements in the two sequences at the same instant nT.

5. A method as claimed in claim 4 wherein the length L of said two pseudo-random sequences is chosen so that $L \geq 2N+1$ and the shift between these two sequences is chosen so that $k=(L-1)/2$.

6. Apparatus for generating a training signal for an echo canceller comprised in a transceiver arrangement between one-way transmit and receive paths coupled to a two-way transmission path, the echo canceller being adapted to cancel an echo signal occurring in the receive path in response to a signal supplied to the transmit path, the echo canceller comprising a transversal filter having N adjustable complex coefficients for processing complex components of the transmit path signal and deriving therefrom a copy of the echo signal, the echo canceller further comprising means for deriving a signal corresponding to the difference between the receive path signal and the echo copy signal; said training signal being constituted by complex periodic data d(n) occurring at instants nT, where T is the data interval and n is any integer, the data being in sequences having a period LT, where L is the number of data in each sequence and LT is at least equal to NT, said training signal having the property:

$$\frac{1}{\sigma^2} \sum_{n=0}^{L-1} d(n) \cdot d^*[(n-i) \text{modulo } L] = -1$$

for every integer i such that $1 \leq i \leq N-1$, $d^*(n)$ being the complex conjugate value of d(n) and $\sigma^2$ being a constant term representative of the power of each of the transmitted data;
said training signal further having the property:

$$\frac{1}{\sigma^2} \sum_{n=0}^{L-1} d^*(n) \cdot d^*[(n-i) \text{modulo } L] = -1$$

for every integer i such that $0 \leq i \leq N-1$;
such apparatus comprising:
a pair of pulse generators for producing two identical pseudo-random sequences of maximum length L, each sequence comprising +1 and −1 pulse elements in synchronism with the frequency 1/T, the two sequences being shifted an integral number of data intervals T with respect to one another;
and a coding circuit connected to said generators for deriving tri-level signals respectively corresponding to the sum and difference of said two sequences at successive data intervals nT, such sum and difference signals respectively constituting the real and imaginary components of the complex data d(n) of the training signal at each of such successive data intervals;
whereby after transmission of a sequence of at least N of the complex data of the training signal, the coefficients of the transversal filter for effecting echo signal cancellation are determined by the sequence of coefficients formed by transmission of the next sequence of L data in accordance with the expression:

$$\vec{C} = \vec{C}_o + \frac{2}{(L+1)\sigma^2} \sum_{n=0}^{L-1} e_R(n) \cdot D^*(n)$$

where $\vec{C}$ is the vector of the N coefficients obtained at the end of the calculation,
$C_o$ is the vector of the N initial coefficients,
$e_R(n)$ is said difference signal,
$D^*(n)$ is the vector of the complex conjugate of values of the last N data entering the transversal filter, and
$\sigma^2$ is a constant term representative of the power of each of the transmitted data.

* * * * *